No. 793,106. PATENTED JUNE 27, 1905.
H. SPAETH.
KITCHEN UTENSIL.
APPLICATION FILED DEC. 12, 1904.

Witnesses. Inventor.

No. 793,106. Patented June 27, 1905.

UNITED STATES PATENT OFFICE.

HENRY SPAETH, OF MILWAUKEE, WISCONSIN.

KITCHEN UTENSIL.

SPECIFICATION forming part of Letters Patent No. 793,106, dated June 27, 1905.

Application filed December 12, 1904. Serial No. 236,619.

*To all whom it may concern:*

Be it known that I, HENRY SPAETH, residing in Milwaukee, in the county of Milwaukee and State of Wisconsin, have invented new and useful Improvements in Kitchen Utensils, of which the following is a description, reference being had to the accompanying drawings, which are a part of this specification.

My invention relates to a utensil adapted to be used in kitchens and cooking establishments for crushing, comminuting, and beating up or flocculating cooked potatoes.

The invention consists of the device or apparatus and its parts and combinations of parts, as herein described and claimed, or the equivalents thereof.

Figure 1:
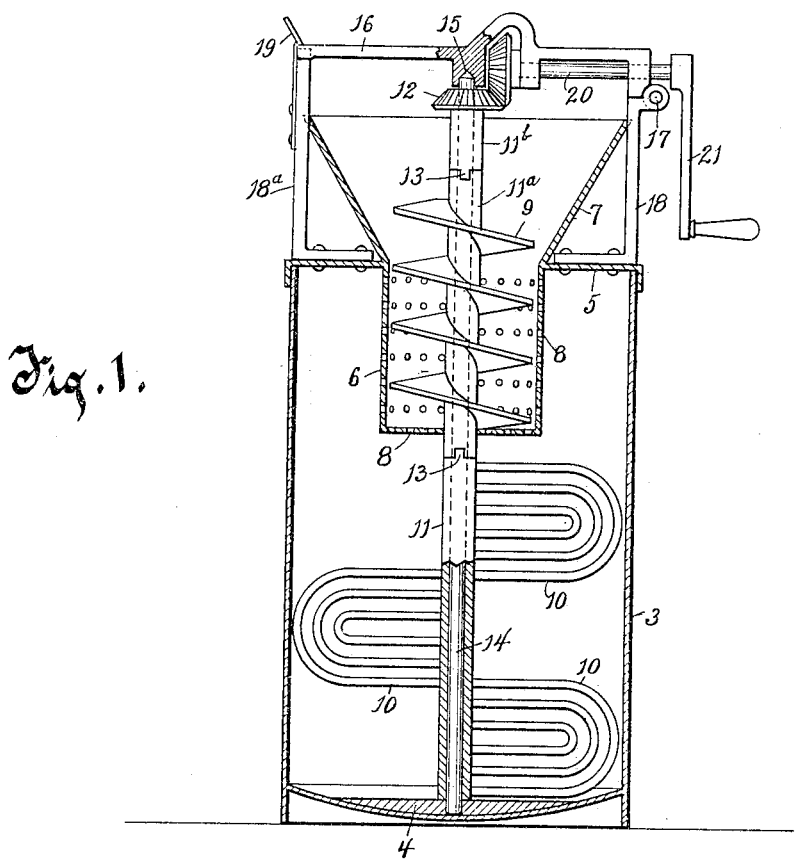
Figure 2:
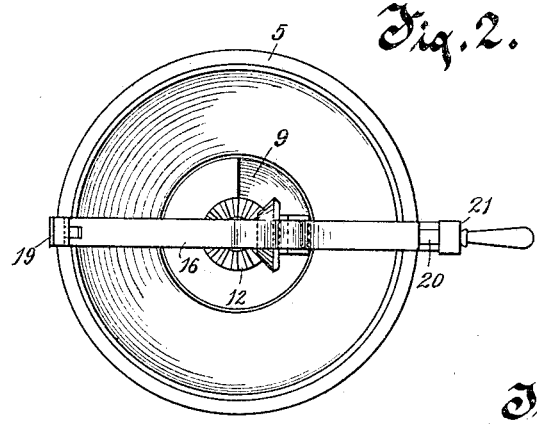

In the drawings, Figure 1 is a vertical section of my improved kitchen utensil or device. Fig. 2 is a top plan view of the utensil.

In the drawings, 3 represents an upright cylindrical vessel, advisably of sheet metal, having a bottom 4 adapted to serve as a step or foot for a vertical rod or shaft. A detachable cover 5, having a rim adapted to fit over the top of the receptacle 3 is provided, which cover is also advisably of sheet metal. The cover 5 is provided with a central aperture into which is fitted a comminuting cylindrical case 6, the upper portion of which flares outwardly, forming a funnel-shaped hopper 7. This case and hopper are advisably made integrally from sheet metal and rigid in the cover 5. The side wall and bottom of the case 6 is provided with many holes or perforations 8. These holes are of relatively small size, so as to admit of the passage therethrough of only small particles or comparatively fine streams of the crushed and thereby comminuted potato.

The hopper 7 is adapted to receive a supply of boiled and peeled potatoes, and for means of forcing the potatoes downwardly in the case 6 and crushing them and forcing the crushed material out through the holes 8 I provide a revolving screw 9, the diameter of the blades of which screw is such that the blades just fit within the cylindrical case 6, the screw extending from in the lower portion of the hopper 7 down to the bottom of the case 6. When the potato has been crushed by being forced down in the case 6 by the screw 9 and is completely comminuted by being forced by the same screw out through the holes 8, it falls into the receptacle 3 and is there beaten up and made flocculent or fluffy by being beaten by revolving arms 10, fixed in and projecting radially from the vertically-disposed shaft 11. These arms 10 are conveniently made of wire formed into loops of varying sizes, one loop arranged within another and a series of the loops being arranged in sections on and around the shaft 11, as clearly shown in Fig. 1. The arms are of such length as to revolve freely in the receptacle 3, extending substantially to the inclosing wall of the receptacle.

For rotating the shaft 11 and the screw 9 and at the same time providing for removing all the parts from the receptacle for cleaning the shaft 11 is advisably made in sections, the lower section of which has the arms 10 affixed thereto and another section of which 11ª has the screw 9 mounted rigidly thereon, and still another section 11ᵇ is provided with a beveled gear 12. This shaft is advisably made hollow, and the several sections thereof are keyed together, compelling concurrent rotation by means of tongues and grooves 13, so that the sections of the shaft can be separated, while when they are in contact, as shown in Fig. 1, the shaft throughout its length is compelled to rotate concurrently. To hold these sections of the shaft suitably in position, a rod or axle 14 may be employed, which at its lower end is footed in a socket therefor in the bottom 4 of the receptacle and which at its upper end has a bearing in a boss 15, forming a part of a cross-bar 16, pivoted at one end at 17 to a standard 18, fixed on the cover 5. The other end of the bar 16 rests on a standard 18ª, also fixed on the cover 5, and is held releasably thereto by a spring-catch 19. An arbor 20, mounted in the cross-bar 16, is provided at its inner end with a pinion that meshes with the pinion 12 and at its outer end is provided with a detachable crank-handle 21.

What I claim as my invention is—

1. A kitchen device, comprising an upright cylindrical receptacle, a removable cover having a central aperture, a cylindrical perforated case in and below said aperture in said cover, a hopper on the case, a crushing-screw in the case, revoluble beating-arms in the receptacle below the perforated case, and means for rotating the screw and the arms.

2. In combination in a kitchen device, an upright cylindrical receptacle, a removable cover, a cylindrical perforated case in the receptacle, a crushing-screw in the case, revolving beating-arms in the receptacle, and means for rotating the screw and the beating-arms.

3. In a kitchen device, a receptacle having a substantially smooth interior surface, a perforated cylindrical case in the receptacle, a crushing-screw in the case provided with a rigid shaft-section, a shaft-section having radial arms in the receptacle below and in alinement with the screw-shaft, means for detachably interlocking the screw shaft-section and the arms shaft-section to compel a concurrent rotation, and means for rotating the interlocked shaft-sections.

4. In combination, an upright receptacle, a perforated cylindrical case in the receptacle near its top, a hopper on the case, a plurality of hollow shaft-sections having means for interlocking them in axial alinement, a crushing-screw on one shaft-section and in the perforated case, radial beating-arms on another shaft-section below the case, a pinion on a shaft-section, an axial rod within the shaft-sections, and a driving-arbor geared to the shaft-pinion.

5. In combination, an upright cylindrical receptacle, a removable cover, a cylindrical perforated case fitted in and depending from the cover, a hopper on the case, a shaft-section with a crushing-screw in the case, a shaft-section with beating-arms in the receptacle in alinement with the screw shaft-section, a shaft-section with a pinion, means for coupling the shaft-sections detachably, a cross-bar mounted removably on said cover, and an arbor mounted in said cross-bar and geared to said shaft-pinion.

In testimony whereof I affix my signature in presence of two witnesses.

HENRY SPAETH.

Witnesses:
ANNA F. SCHMIDTBAUER,
C. T. BENEDICT.